United States Patent [19]
Saltzstein

[11] 3,725,939
[45] Apr. 3, 1973

[54] VEHICLE SECURITY SYSTEM

[75] Inventor: Julian I. Saltzstein, Cleveland, Tenn.

[73] Assignee: Sure Lock Systems, Inc., Cleveland, Tenn.

[22] Filed: June 7, 1971

[21] Appl. No.: 150,509

[52] U.S. Cl. ................................343/225, 317/147
[51] Int. Cl. .........................H01h 47/20, H04b 7/00
[58] Field of Search .......343/225; 340/171; 317/147; 70/277, 279

[56] References Cited

UNITED STATES PATENTS

| 3,142,166 | 7/1964 | Adam et al. | 70/279 |
| 3,550,408 | 12/1970 | Archaux et al. | 317/136 X |
| 3,438,037 | 4/1969 | Leland | 343/225 |

FOREIGN PATENTS OR APPLICATIONS 974,420  11/1964  Great Britain..........................318/16

Primary Examiner—Donald J. Yusko
Attorney—Prangley, Dithmar, Vogel, Sandler & Stotland

[57] ABSTRACT

A security system for automatically locking and unlocking the door of a vehicle has a radio receiver mounted on the vehicle, which receiver provides a control signal when the proper RF signal is being received. An actuator responds to the control signal and unlocks the locking mechanism of the door and maintains the same unlocked as long as the control signal is present. A portable radio transmitter is adapted to be carried by the driver of the vehicle and is operative to provide an RF signal, so that the locking mechanism will be unlocked as long as the driver is within a predetermined distance from the door and will be locked when the driver is beyond that distance.

14 Claims, 7 Drawing Figures

PATENTED APR 3 1973 3,725,939
SHEET 1 OF 2
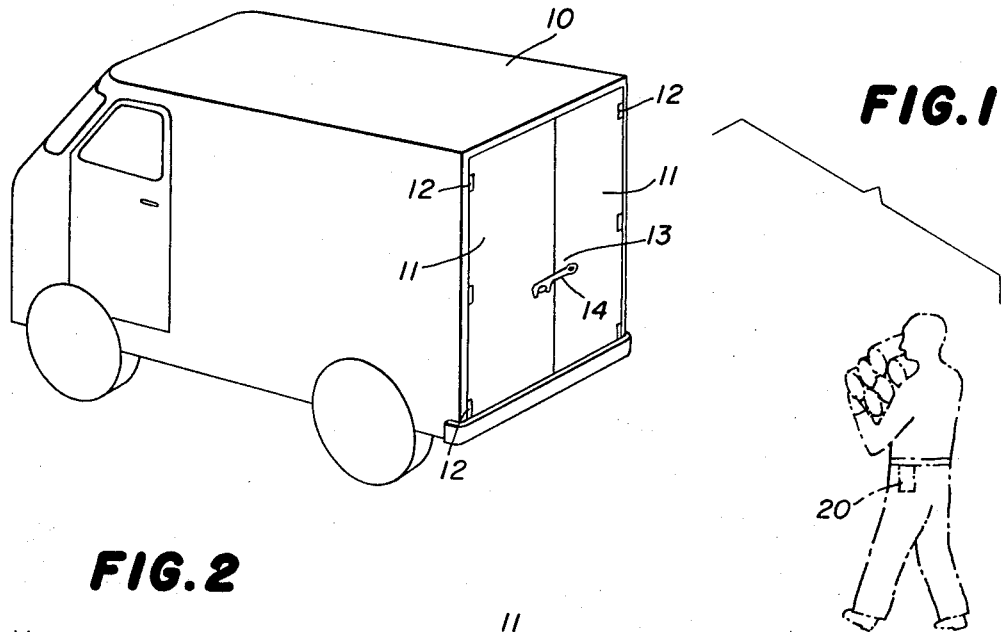
FIG.1
FIG.2
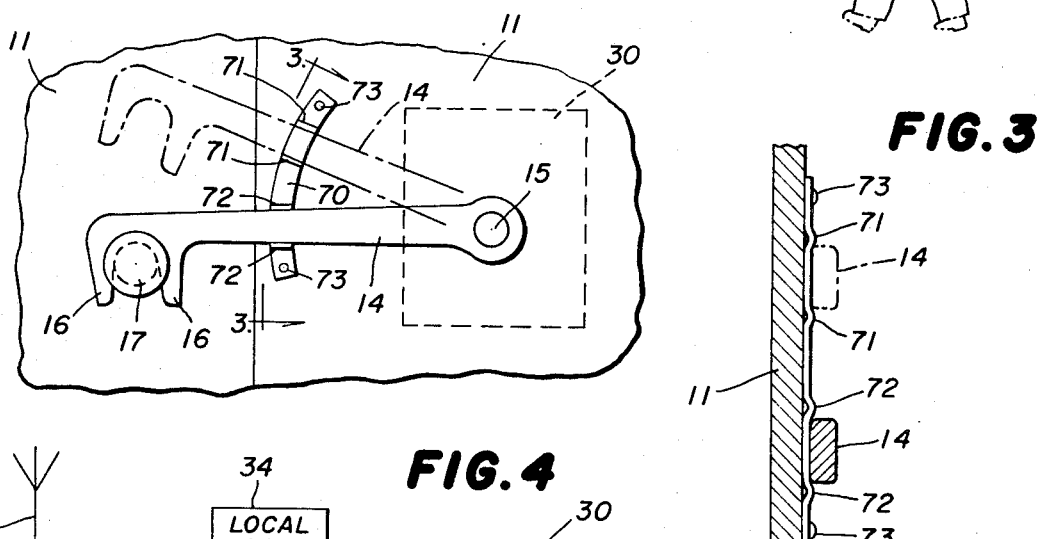
FIG.3
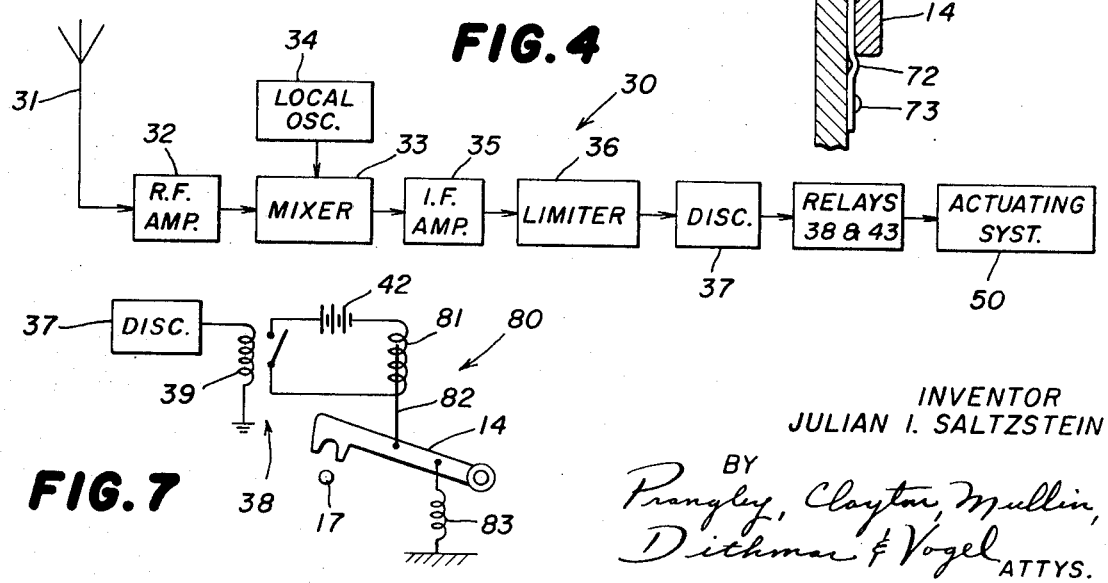
FIG.4
FIG.7
INVENTOR
JULIAN I. SALTZSTEIN
BY
Prangley, Clayton, Mullin,
Dithmar & Vogel ATTYS.

VEHICLE SECURITY SYSTEM

It is an important object of the present invention to provide a security system for a vehicle, which automatically locks the vehicle when the driver is beyond a predetermined distance therefrom and automatically unlocks the vehicle as long as he is within that predetermined distance.

Another object of the present invention is to provide a security system for a vehicle which enables the driver to unlock the door thereof without having to use his hands.

Still another object of the present invention is to provide a security system for a vehicle to and from which the driver has to carry goods, the security system providing selective locking and unlocking of the vehicle without the driver having to use his hands.

A further object is to provide a security system for automatically locking and unlocking the door of a vehicle, yet minimizing power drain on the vehicle battery and also minimizing the wear to components of the system.

In summary, there is provided a security system for automatically locking and unlocking the locking mechanism on the door of a vehicle, the security system comprising a radio receiver on the vehicle and being responsive to an RF signal exceeding a predetermined value to provide a control signal at the output of the receiver, an actuator electrically coupled to the output of the receiver and mechanically coupled to the latch, the actuator having a first condition for unlocking the locking mechanism and having a second condition for locking the locking mechanism, the actuator being operated by the control signal into its first condition and being operated in the absence of the control signal into its second condition, and a portable radio transmitter operative to provide an RF signal which exceeds the predetermined value when the transmitter is within a predetermined distance from the receiver, whereby the locking mechanism will be unlocked when the transmitter is within the predetermined distance and will be locked when the transmitter is beyond the predetermined distance.

With the foregoing and other objects in view which will appear as the description proceeds, the invention consists of certain novel features of construction, arrangements, and a combination of parts hereinafter fully described, illustrated in the accompanying drawings, and particularly pointed out in the appended claims, it being understood that various changes in the details of the structure may be made without departing from the spirit or sacrificing any of the advantages of the invention.

For the purpose of facilitating an understanding of the invention, there are illustrated in the accompanying drawings preferred embodiments thereof, from an inspection of which, when considered in connection with the following description, the invention, its mode of construction, assembly and operation, and many of its advantages should be readily understood and appreciated.

FIG. 1 illustrates a truck and a person approaching the truck with his hands and arms loaded, the transmitter forming part of the security system of the present invention being carried by the person;

FIG. 2 illustrates the latch on the door of the vehicle in its locked and unlocked positions;

FIG. 3 is a view in section taken along the line 3—3 of FIG. 2;

FIG. 4 is a block diagram of the receiver mounted on the vehicle forming part of the security system;

FIG. 7 is a view of an alternate form for actuating the locking mechanism.

Figure 5:
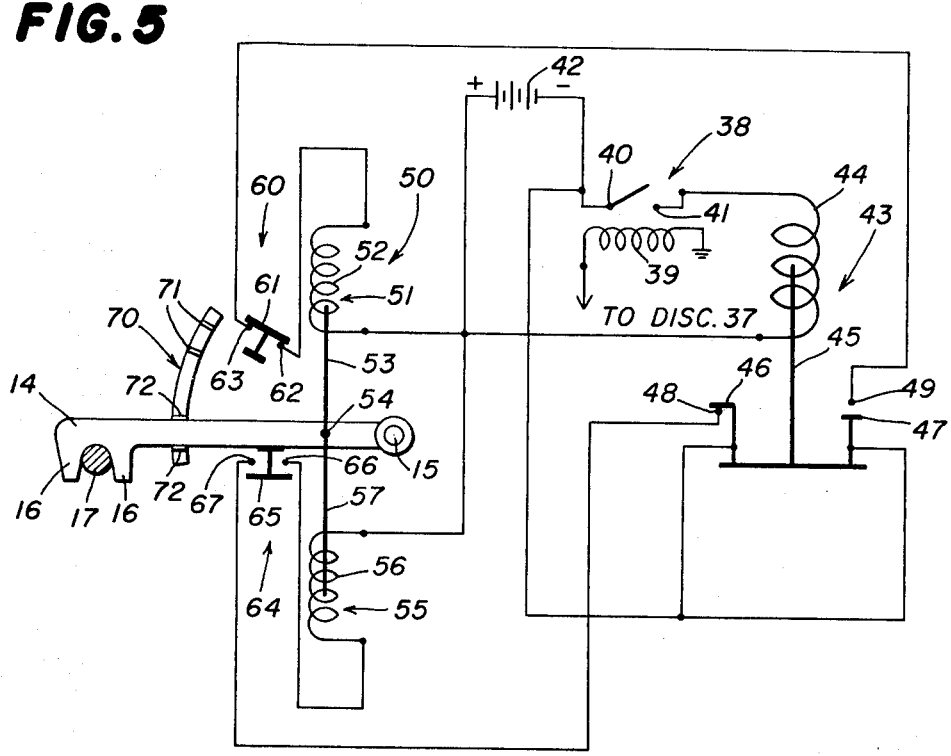
FIG. 5 is a view of the latch in its locked position and the corresponding condition of various parts of the security system.

Referring now to the drawings, there is shown in FIG. 1 a vehicle with which the security system disclosed herein may be used. In the specific form shown, the vehicle is a delivery truck 10 having at the rear a pair of doors 11 that are generally vertically disposed and mounted along the sides thereof by means of hinges 12. Thus, the doors 11 pivot outwardly to enable the driver to gain access to the interior of the truck 10. Associated with the doors 11 is a locking mechanism 13 which serves to lock the doors to preclude unauthorized entry. There is shown in phantom a person approaching the truck 10 and carrying a bundle of soiled toweling so as to render it impossible or highly difficult to use his hands to unlock the unlocking mechanism 13. It is the purpose of this invention, as will be explained in greater detail as the description proceeds, to enable that person to lock and unlock the locking mechanism 13 without the use of his hands. Partly to that end, there is provided a portable RF transmitter 20 carried on the belt of the person.

Considering now FIGS. 2 and 3, certain details of the locking mechanism 13 will be described. In the form shown, there is provided a latch 14 pivotally mounted at one end thereof by means of a pin 15 to one of the doors 11. The other end of the latch 14 is formed into a pair of spaced-apart jaws 16. Disposed on the other door 11 is a keeper 17 which is in substantial horizontal alignment with the pin 15 and is arranged to seat within the jaws 16 of the latch 14. When the latch 14 is in the position shown in solid lines, the locking mechanism 13 is in the locked position thereof and when the latch 14 is as shown in phantom, the locking mechanism 13 is in the unlocked position thereof.

Associated with the latch 14 and forming a part of the vehicle security system, is a radio receiver 30. Referring to FIG. 4, the receiver 30 is adapted to receive a modulated RF carrier wave at an antenna 31, which antenna 31 is coupled to the input of an RF amplifier 32. The output of the amplifier 32 is applied as one input to a mixer 33, the usual local oscillator 34 being provided and having the output thereof connected as a second input to the mixer 33. As is well-known by those skilled in the art, the mixer 33 serves to "mix" the signal from the RF amplifier 32 with the signal from the local oscillator 34, to provide an intermediate frequency (IF) signal which has a reduced frequency. The IF signal is applied to the IF amplifier 35 which amplifies the same and applies the amplified signal to a limiter 36. The signal is amplified to limiting therein and is then applied to a discriminator 37 which detects the modulation components in the RF signal applied to the antenna 31 and develops a control signal in the form of a voltage. Further explanation of the elements 31 to 37 is not believed to be necessary, as the details thereof are well-known to those skilled in the art. It is sufficient to note that, if an RF wave is applied to the antenna 31 which has a frequency to which the receiver 30 is tuned, an output from the discriminator 37 will be developed for application to the relays 38 and 43.

Figure 6:
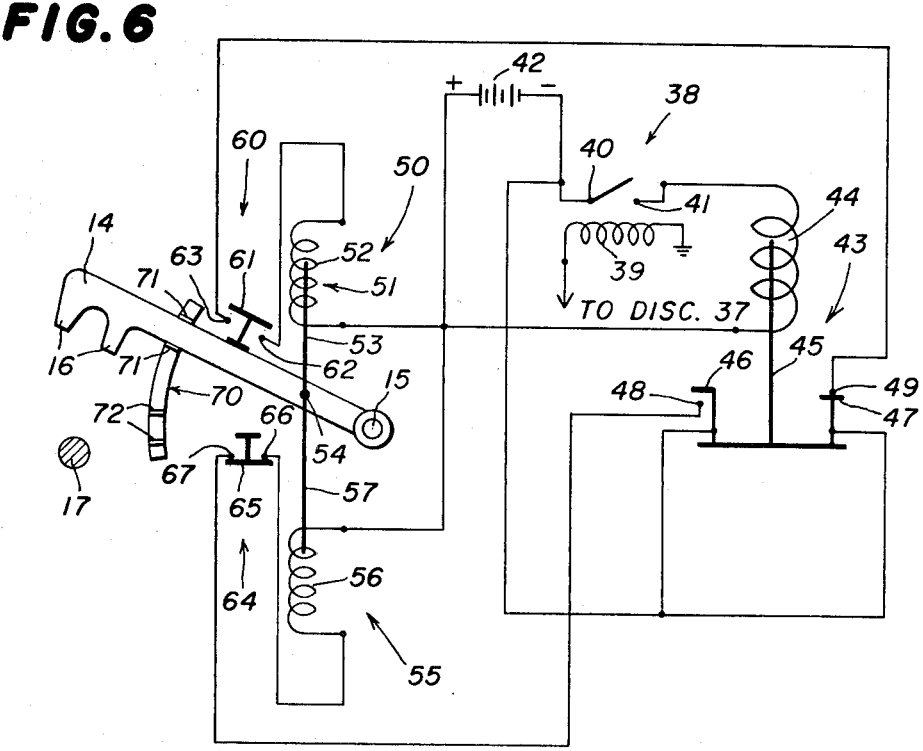
FIG. 6 is a view of the latch in its unlocked position with the various parts of the security system in the corresponding condition.

Turning now to FIG. 5, further details of the security system will be explained. The output of the discriminator 37 is applied to the winding 39 of a first relay 38. The contact 40 of the relay 38 is coupled to the negative terminal of the battery 42 of the vehicle, the other contact 41 being coupled to one terminal of the winding 44 of a second relay 43. Associated with the relay 43 is a plunger 45 carrying a pair of movable contacts 46 and 47. The relay 43 also includes a pair of fixed contacts 48 and 49 in position respectively to being engaged by the contacts 46 and 47. The relay 43 is so constructed that, when current is not flowing through the winding 44, the plunger 45 projects substantially from the winding 44, so that the movable contact 46 engages the fixed contact 48 and the movable contact 47 is disengaged from the movable contact 49 as shown in FIG. 5. On the other hand, when the winding 44 is energized by virtue of current flowing therethrough, the plunger 45 is withdrawn to carry the movable contact 46 out of engagement with the fixed contact 48 and to carry the movable contact 47 into engagement with the fixed contact 49, as shown in FIG. 6.

The winding 44 is coupled to the positive terminal of the battery 42 and is also coupled to an actuating mechanism 50, which actuating mechanism 50 includes a first actuator 51 having a solenoid winding 52 and a plunger 53 associated therewith. The plunger 53 is coupled to the latch 14 at a fixed point 54 thereon. The actuating mechanism 50 also includes a second actuator 55, which includes a second solenoid winding 56 and a second plunger 57 associated therewith. The plunger 57 is also coupled to the latch 14 at the fixed point 54 thereon.

The first solenoid winding 52 has one terminal thereof coupled to the fixed contact 62 of a normally closed de-energizing switch 60, the other fixed contact 63 being connected to the fixed contact 49 of the relay 43. The switch 60 also includes a movable contact 61 which is spring-biased to be in normal engagement with fixed contacts 62 and 63. The movable contact 61 is disposed in the path of the latch 14 to be engaged thereby at a point where the latch has separated from the keeper 17 and is thus in its unlocked position. Thus the switch 60 will be opened by the latch 14 after movement thereof to its unlocked position, and will be closed when the latch 14 is in its locked position.

There is also provided a second de-energizing switch 64, the second solenoid winding 56 having one terminal thereof coupled to the fixed contact 66 of the switch 64, the other fixed contact 67 being connected to the fixed contact 48 of the relay 43. The switch 64 also includes a movable contact 65 which is spring-biased to be in normal engagement with the fixed contacts 66 and 67. The movable contact 65 is mounted in the path of the latch 14 so as to be engaged thereby and thus disengage the contact 65 from the contacts 66 and 67. The movable contact 65 is disposed at a point where the latch 14 is in the locked position thereof, that is, with the keeper 17 receiving the jaws 16 of the latch 14. Thus the switch 64 will be closed when the latch 14 is in its unlocked position, and will be open when the latch 14 is in its locked position.

In operation, it will first be assumed that the locking mechanism 13 is in the locked position thereof, that is, the latch 14 is as shown in FIG. 5. In that position, the latch 14 engages the movable contact 65 of the second switch 64 and thereby opens the electrical circuit between the fixed contacts 66 and 67. On the other hand, the movable contact 61 of the fixed switch 60 reverts to its normally closed condition so as to complete the electrical circuit between the contacts 62 and 63. When no RF signal is being received by the antenna 31 so that no current flows through the winding 39 of the relay 38, the contacts 40 and 41 thereof are in the open condition. Thus, the relay 43 will assume the condition shown in FIG. 5, that is, contacts 47 and 49 will be opened and contacts 46 and 48 will be closed. The opened contacts 47 and 49 interrupt the path for current to flow through the solenoid winding 52, whereby that solenoid winding is not energized. Because the movable contact 65 is separated from the fixed contacts 66 and 67, no current will flow through the solenoid winding 56 and, therefore, that solenoid winding will be de-energized also.

If, at this time, an RF signal is applied to the antenna 31 of the receiver 30 (see FIG. 4), a voltage will be developed at the output of the discriminator 37, as previously explained. The voltage across the winding 39 of the relay 38 causes current to flow therethrough, thereby causing the contacts 40 and 41 to close. The current now flows through the winding 44 of the relay 43 to move the plunger 45 to the condition shown in FIG. 6, that is, to close the contacts 47 and 49 and to open the contacts 46 and 48. Because the fixed switch 60 is in the closed condition thereof at this instant, a path for the flow of current is defined from the positive terminal of the battery 42 through the solenoid winding 52, through the contacts 61–63 of the fixed switch 60, through the contacts 47 and 49 of the relay 43, and back to the negative terminal of the battery 42. The solenoid winding 52 is thereby energized to withdraw the plunger 53, thereby pivoting the latch 14 out of the keeper defined by the projections 72, and into the keeper defined by the projections 71. The latch 14 strikes the movable contact 61 so as to disengage it from the fixed contacts 62 and 63, all as shown in FIG. 6. The opening of the switch 60 interrupts the path for current flow through the solenoid winding 52 so as to de-energize the same. However, the latch 14 is maintained in the unlocked condition against the action of gravity by the keeper defined by the projections 71. Thus, as long as the RF signal is being applied to the antenna 31 so as to provide a control signal for energizing the winding 39 of the relay 38, the latch 14 will remain in the open condition thereof, as shown in FIG. 6. It should be noted that no current will flow through the solenoid winding 56 of the actuator 55 at this time, by virtue of the open condition of the contacts 46 and 48 of the relay 43.

When the RF signal terminates, or if it is too weak at the antenna 31 for the receiver 30 to process it, the voltage furnished by the discriminator 37 terminates, thereby deenergizing the relay 38 and opening the contacts 40 and 41. This interrupts the flow of current through the winding 44 of the relay 43, thereby causing the plunger 45 to move out of the winding 44 to the position shown in FIG. 5. Thus, the contacts 46 and 48 are closed to complete a path for current flow from the positive terminal of the battery 42, through the solenoid winding 56, through the contacts 65–67 of the second switch 64, through the contacts 46 and 48 of the relay 43 and back to the negative terminal of the battery 42. The solenoid winding 56 is thereby energized to withdraw the plunger 57, thereby pivoting the latch 14 out of the keeper defined by the projections 71, and into the keeper defined by the projections 72. The jaws 16 seat on the keeper 17 to place the latch 14 in its locked position. The latch 14 strikes the movable contact 65 so as to disengage it from its associated fixed contacts 66 and 67, all as shown in FIG. 5. The opening of the second switch 64 interrupts the path for current flow through the solenoid winding 56 so as to deenergize the same. However, the latch 14 is maintained in the locked condition by the keeper defined by the projections 72. Thus, as long as the RF signal is not being applied to the antenna 31 so that the discriminator 37 does not provide a voltage, the winding 39 of the relay 38 is not energized, the latch 14 will remain in the closed position thereof, as shown in FIG. 5. It should be noted that no current will flow through the solenoid winding 52 of the actuator 51 at this time, by virtue of the open condition of the contacts 47 and 49 of the relay 43.

The RF signal for the receiver 30 is provided by a portable radio transmitter 20 (see FIG. 1) which may conveniently be carried by the driver of the truck 10. As those skilled in the art of radio communication systems will appreciate, the intensity of the RF signal at the receiver, which is mounted on the interior of the right-hand door 11 (as viewed in FIG. 1), increases as the person approaches the truck 10. The sensitivity of the receiver 30 is the minimum magnitude of the RF signal at the antenna 31 which will cause the voltage to be developed by the discriminator 37 to energize the relay 38. If the RF signal at the antenna 31 has a magnitude less than that predetermined value, the relay 38 will not be energized; whereas, as long as the magnitude of the RF signal is greater than that predetermined value, the relay 38 will remain energized. By judiciously selecting the power output of the transmitter 20 and the sensitivity of the receiver 30, the relay 38 can be made to be energized when the transmitter 20 is within a predetermined distance from the receiver 30. In other words, by increasing the power output of the transmitter 20 and/or by increasing the sensitivity of the receiver 30, the relay 38 may be made to actuate at a greater predetermined distance from the receiver 30, whereas, decreasing the power output of the transmitter 20 and/or decreasing the sensitivity of the receiver 30 will cause the relay 38 to be energized at a lesser predetermined distance from the receiver 30. In one specific form of the invention, the power output of the transmitter 20 and the sensitivity of the receiver 30 were adjusted to cause the relay 38 to be energized as long as the transmitter 20 was no more than 10 feet from the receiver 30.

Considering now the over-all operation of the vehicle security system, it will be assumed that the delivery truck 10 is used in a business for picking up soiled toweling and replacing it with clean toweling. The driver has mounted on his clothing, such as in his shirt pocket or on his belt, a transmitter 20, which transmitter is continuously on so as continuously to transmit an RF signal. When the truck 10 arrives at the place of business of its customer, the driver gets out of the cab and walks around toward the rear. When he reaches a predetermined distance (in this example, that distance is assumed to be 10 feet), the RF signal will be of sufficient intensity to cause the relay 38 to become energized, as previously explained, which, in turn, energizes the solenoid winding 52 thereby withdrawing the plunger 53 to move the latch 14 to the open position thereof. The driver then enters the truck 10 and removes the customer's load of clean toweling. Now, the driver has his hands and arms fully loaded and it would be difficult, if not impossible, to use his hands. It is, however, a simple matter for him to close the doors by use of his shoulders or legs. The driver then leaves the truck 10, carrying away his load. When the driver is beyond a predetermined distance from the receiver 30, the relay 38 becomes de-energized, as previously explained, causing the solenoid winding 56 to become energized, thereby withdrawing the plunger 57 and moving the latch 14 to the locked position thereof. The latch 14 will remain in such a position as long as the driver is without the predetermined distance from the receiver 30. The driver carries the load of clean toweling to the customer and removes the soiled toweling therefrom. He returns to the truck 10, again with his arms and hands fully loaded, making it difficult to use his hands. However, as soon as the driver is less than the predetermined distance from the receiver 30, the relay 38 again becomes energized to cause the latch 14 to move to the open position thereof. The doors 11 may be slightly spring-loaded so as to spring out a bit upon unlocking, whereupon the driver may again use his shoulders or legs to open fully the doors 11 and permit him to enter the truck 10 and drop off the soiled toweling.

One particularly advantageous facet of the security system described herein is the automatic locking and unlocking of the locking mechanism 13. In the past, the driver while bringing in a load of clean toweling, simply left the doors unlocked, thereby facilitating unauthorized entry. With the security system disclosed herein, the driver need only close the doors and automatic locking is achieved when he leaves the area defined by the predetermined distance.

Preferably, the receiver sensitivity is maximized and the power output of the transmitter 20 is minimized so as to minimize the size and weight of the transmitter 20 which must be carried by the driver. For example, the transmitter 20 may utilize a 3-volt battery which is rechargeable. A range adjustment may be provided on the transmitter 20 so as to control the power output thereof, thereby enabling control of the exact value of the predetermined distance. The range control may be simply in the form of a rheostat associated with the battery. The antenna for the transmitter 20 may be a ferrite loop stick. A suitable frequency for the RF signal emitted by the transmitter 20 may be, for example, 80 megacycles or in the range of 215–256 megacycles. These are merely suggestions and are not intended to have any limiting effect.

The actuating mechanism 50 is intended only to be exemplary, the one shown being particularly adapted to prolonging use of the solenoid winding. Another type of actuating mechanism may be utilized, such as one having a single solenoid winding and plunger to move the latch against the action of a spring. The spring holds the latch in the locked condition thereof and reception of an RF signal by the receiver will cause energization of the single solenoid winding to move the latch against the action of the spring into the open position thereof. Such an alternative approach is shown in FIG. 7. The contacts 40 and 41 of the relay 38 are coupled in series with the battery 42 and the solenoid winding 81 of an actuator 80, the plunger 82 thereof being connected to the latch 14. A spring 83 is connected to the latch 14 so as to bias the latch 14 counterclockwise, as viewed in FIG. 7. The presence of an RF signal causes energization of the solenoid winding 81 to rotate the latch 14 counterclockwise, as viewed in FIG. 7, thereby placing the latch 14 in the unlocked position thereof. The termination of the RF signal causes de-energization of the solenoid winding 81 and the return of the latch 14 to the locked position thereof by action of the spring 83. The construction may be reversed, such that the spring 83 urges the latch 14 to the unlocked position thereof, and the actuator 80 moves the latch 14 to the locked position thereof.

It is to be understood that the form shown in FIGS. 1 to 6 has the advantage over the form shown in FIG. 7, in that the time that current flows through the solenoid windings in the former embodiment is minimized. After the latch has been moved to the open position thereof by energization of one solenoid winding, that winding immediately becomes de-energized and is retained in the open position by a keeper structure. Similarly, when the other solenoid winding moves the latch 14 to the closed position thereof, that solenoid winding immediately becomes de-energized, and the latch is maintained in that position by another keeper structure. Thus, current flows through the solenoid windings for very brief intervals.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention, as defined in the appended claims.

What is claimed is:

1. A security system to enable a person automatically to lock and to unlock the locking mechanism on the door of a vehicle without using his hands to operate the mechanism, said security system comprising a radio receiver on the vehicle responsive to an RF signal exceeding a predetermined value to provide a control signal at the output of the receiver, actuator means electrically coupled to the output of said receiver and mechanically coupled to the latch, said actuator means having a first condition for unlocking the locking mechanism and having a second condition for locking the locking mechanism, said actuator means being operated by the control signal into its first condition substantially for the period during which the control signal is present, and being operated in the absence of the control signal into its second condition substantially for the period during which the control signal is absent, and a portable radio transmitter for wearing by the person and being operative to provide an RF signal which exceeds said predetermined value when the transmitter is within a predetermined distance from said receiver, said transmitter being energized to provide the RF signal continuously without further use of the person's hands until said transmitter is later de-energized to terminate the RF signal, whereby the locking mechanism will be unlocked automatically without the person having to use his hands when the person is within said predetermined distance and will be locked automatically without the person having to use his hands when the person is beyond said predetermined distance.

2. The security system set forth in claim 1, wherein said RF signal is a modulated carrier wave, said receiver includes means to detect the modulation components in the carrier wave.

3. The security system set forth in claim 1, wherein said actuator means includes at least one solenoid winding coupled to the output of said receiver and at least one plunger coupled to the latch, said solenoid winding being energized by the control signal to cause the plunger to move the latch from one position thereof to the other position thereof.

4. The security system set forth in claim 1, wherein the sensitivity of said receiver and the power output of said transmitter are selected to enable said predetermined distance to be on the order of about ten feet.

5. A security system to enable a person automatically to move the latch on the door of a vehicle between locked and unlocked positions without using his hands to operate the latch, said security system comprising a radio receiver on the vehicle responsive to an RF signal exceeding a predetermined value to provide a control signal at the output of the receiver, actuator means including a solenoid winding coupled to the output of said receiver and a plunger coupled to the latch, said solenoid winding being energized by the control signal to cause said plunger to move the latch from one of its positions to the other of its positions substantially for the period during which the control signal is present, circuit means electrically coupled to said solenoid winding and being mounted adjacent to the latch and arranged to be engaged thereby after movement thereof to said other position for de-energizing said solenoid winding substantially for the period during which the control signal is absent, and a portable radio transmitter for wearing by the person and being operative to provide an RF signal which exceeds said predetermined value when the transmitter is within a predetermined distance from said receiver, said transmitter being energized to provide the RF signal continuously without further use of the person's hands until said transmitter is later de-energized to terminate the RF signal, whereby the latch will be in its unlocked position automatically without the person having to use his hands when the person is within said predetermined distance and will be in its locked position automatically without the person having to use his hands when the person is beyond said predetermined distance.

6. The security system set forth in claim 5, and further comprising keeper structure disposed adjacent to the latch and arranged to be engaged thereby upon moving to said other position thereof, thereby to retain the latch in said other position thereof after said circuit means has de-energized said solenoid winding.

7. The security system set forth in claim 5, wherein said circuit means includes a switch having at least one fixed contact and a movable contact, said movable contact being positioned to be engaged by the latch and carried into engagement with said fixed contact.

8. The security system set forth in claim 5, wherein said circuit means is a switch connected in series with said solenoid winding, said switch being in the closed condition thereof when said solenoid winding is being energized and being opened after movement of the latch to said other position thereof for de-energizing said solenoid winding.

9. A security system to enable a person automatically to move the latch on the door of a vehicle between locked and unlocked positions without using his hands to operate the latch, said security system comprising a radio receiver on the vehicle responsive to an RF signal exceeding a predetermined value to provide a control signal at the output of the receiver, actuating means including first and second solenoid windings coupled to the output of said receiver and first and second plungers respectively associated with said solenoid windings, said first plunger being coupled to the latch and being arranged for moving the latch to the unlocked position thereof, said second plunger being coupled to the latch and being arranged for moving the latch to the locked position thereof, said first solenoid winding being energized by the control signal to operate said first plunger to move the latch to the unlocked position thereof substantially for the period during which the control signal is present, first circuit means electrically coupled to said first solenoid winding and being mounted adjacent to the latch and arranged to be engaged thereby after movement thereof to its unlocked position for de-energizing said first solenoid winding, said second solenoid winding being energized in the absence of the control signal to operate said second plunger to move the latch to the locked position thereof substantially for the period during which the control signal is absent, second circuit means electrically coupled to said second solenoid winding and being mounted adjacent to the latch and arranged to be engaged thereby after movement thereof to its locked position for de-energizing said second solenoid winding and a portable radio transmitter for wearing by the person and being operative to provide an RF signal which exceeds said predetermined value when the transmitter is within a predetermined distance from said receiver, said transmitter being energized to provide the RF signal continuously without further use of the person's hands until said transmitter is later de-energized to terminate the RF signal, whereby the latch will be in its unlocked position automatically without the person having to use his hands when the person is within said predetermined distance and will be in its locked position automatically without the person having to use his hands when the person is beyond said predetermined distance.

10. The security system set forth in claim 9, wherein said first plunger is arranged to pull the latch into the unlocked position thereof and said plunger is arranged to pull the latch into the locked position thereof.

11. The security system set forth in claim 9, and further comprising keeper structure disposed adjacent to the latch and having first and second portions, said first portion being arranged to hold the latch in the unlocked position thereof after said first solenoid winding has been energized and then de-energized, said second portion being arranged to hold the latch in the locked position thereof after said second solenoid winding has been energized and then de-energized.

12. The security system set forth in claim 9, wherein each of said circuit means includes a normally closed switch arranged to be opened upon engagement thereof by the latch.

13. A security system to enable a person automatically to lock and to unlock the door of a vehicle without using his hands, said security system comprising a keeper on the vehicle, a latch pivotally mounted on the vehicle and pivotable between a locked position for engaging said keeper and an unlocked position disengaged from said keeper, a radio receiver on the vehicle responsive to an RF signal exceeding a predetermined value to provide a control signal at the output of the receiver, actuator means including a solenoid winding coupled to the output of said receiver and a plunger coupled to said latch, said solenoid winding being energized by the control signal to cause said plunger to pivot said latch to the unlocked position thereof substantially for the period during which the control signal is present, said solenoid winding being de-energized by the absence of the control signal to cause said plunger to pivot said latch to the locked position thereof substantially for the period during which the control signal is absent, and a portable radio transmitter for wearing by the person and being operative to provide an RF signal which exceeds said predetermined value when the transmitter is within a predetermined distance from said receiver, said transmitter being energized to provide the RF signal continuously without further use of the person's hands until said transmitter is later de-energized to terminate the RF signal, whereby said latch will be in its unlocked position automatically without the person having to use his hands when the person is within said predetermined distance and will be in its locked position automatically without the person having to use his hands when the person is beyond said predetermined distance.

14. The security system set forth in claim 1, wherein said actuator means is operated from said first condition to said second condition at the termination of the control signal.

* * * * *

UNITED STATES PATENT OFFICE
CERTIFICATE OF CORRECTION

Patent No. 3,725,939          Dated  April 3, 1973

Inventor(s) Julian I. Saltzstein

It is certified that error appears in the above-identified patent and that said Letters Patent are hereby corrected as shown below:

Column 10, Claim 10, line 6, after "said" insert --second--.

Signed and sealed this 28th day of August 1973.

(SEAL)
Attest:

EDWARD M. FLETCHER, JR.          RENE D. TEGTMEYER
Attesting Officer                Acting Commissioner of Patents